United States Patent [19]
McMichael

[11] Patent Number: 4,944,591
[45] Date of Patent: Jul. 31, 1990

[54] DOUBLE PHASE-CONJUGATE FIBER OPTIC GYROSCOPE

[75] Inventor: Ian C. McMichael, Port Hueneme, Calif.

[73] Assignee: Rockwell International Corporation, El Segundo, Calif.

[21] Appl. No.: 280,088

[22] Filed: Dec. 5, 1988

[51] Int. Cl.$^5$ .............................................. G01B 9/02
[52] U.S. Cl. ..................................... 356/350; 356/351
[58] Field of Search .............................. 356/350, 351

[56] References Cited

U.S. PATENT DOCUMENTS 4,429,393  1/1984  Giuliano .............................. 356/350
4,681,446  7/1987  Yeh ...................................... 356/350

OTHER PUBLICATIONS

Feinberg, Self-Pumped, Continuous-Wave Phase Conjugator using Internal Reflection, Optics Letters, vol. 7, pp. 486-488 (1982).
Fischer et al., New Optical Gyroscope Based on the Ring Passive Phase Conjugator, Applied Physics Letters, vol. 47, pp. 1-3 (1985).
McMichael et al., Self-Pumped Phase-Conjugate Fiber-Optic Gyro, Optics Letters, vol. 11, pp. 686-688.
Yeh et al., Phase-Congugate Fiber-Optic Gyro, Applied Optics, vol. 25, pp. 1029-1030 (1986).
Yeh et al., Phase-Conjugate Ring Gyros and Photorefractive-Biased Ring Gyros, Optical Ring Gyros, pp. 102-109 (1984).

Primary Examiner—Davis L. Willis
Assistant Examiner—S. A. Turner
Attorney, Agent, or Firm—John J. Deinken

[57] ABSTRACT

An optical fiber rotation sensor includes a source of coherent light and a first polarizing beam splitter for transmitting a first component of the coherent light having a first polarization direction and reflecting a second component of the coherent light having a second polarization direction orthogonal to the first polarization direction. A coiled multimode optical fiber is coupled to the first beam splitter with the first and second components propagating in the fiber in opposite directions. A polarizer transmits a linearly polarized third component containing equal contributions from the first and second components. A half-wave plate rotates the polarization of the third component by 45°. A self-pumped phase conjugating element reflects a phase-conjugated fourth component such that the fourth component retraverses the half-wave plate and the polarizer, then is divided by the first polarizing beam splitter into fifth and sixth components propagating in the fiber in opposite directions. A second polarizing beam splitter transmits a seventh component having the first polarization direction and reflects an eighth component having the second polarization direction. A first detector measures the power of the seventh component, while a second detector measures the power of the eighth component, the difference being related to the angular motion of the rotation sensor.

4 Claims, 2 Drawing Sheets

… …

DOUBLE PHASE-CONJUGATE FIBER OPTIC GYROSCOPE

GOVERNMENT RIGHTS

The U.S. Government has rights in this invention pursuant to a contract awarded by the U.S. Office of Naval Research.

BACKGROUND OF THE INVENTION

This invention is concerned with optical fiber gyroscopes.

A mechanical gyroscope utilizes the inertia of a spinning mass to provide a reference direction useful in various applications, such as the navigation of an airplane or a spacecraft. The moving parts required in a mechanical gyroscope, however, cause some undesirable attributes, such as high drift rates resulting from friction. The ring laser gyroscope was developed to avoid some of these difficulties.

The ring laser gyroscope maintains a constant frame of reference by circulating massless light waves in a closed path. A typical ring laser gyroscope, for example, consists of a triangular resonant cavity defined by three corner mirrors. A gas laser generates a monochromatic light beam which is split into two beams. These beams are made to propagate in clockwise and counterclockwise directions in the cavity. If the gyroscope is rotated about an axis which has a component normal to the plane of the optical path, the frequency of one of the beams will be increased, while the frequency of the other will decrease, because of the doppler effect. The beams can then be extracted and combined to produce a beat frequency which is indicative of the magnitude and direction of the rotation.

Although ring laser gyroscopes have been developed to the point of production, limitations in this device have motivated researchers to seek other design approaches. One of the most significant difficulties with ring laser gyroscopes involves the cavity mirrors. Although the laser beams within the optical cavity would ideally be totally reflected by the mirrors, the reflective surfaces cannot be made perfectly reflective. Consequently, a small amount of light is scattered backward from microscopic scattering centers in each surface, thereby transferring energy to the oppositely travelling wave. At slow rates of rotation, this coupling causes the frequencies of the two beams to lock together at a single frequency, thereby preventing the measurement of such rates.

Although various solutions have been implemented to compensate for this lockin problem, one appealing possibility is the use of an optical fiber to serve as the optical path for the gyroscope. In addition to eliminating mirrors, such an optical fiber gyroscope offers the advantages of low cost and compact size in an apparatus with no moving parts. In its simplest form, a fiber optic gyroscope includes a laser whose output is directed toward a beam splitter, which divides the laser beam into two equal parts. Each beam is coupled into an end of a coiled optical fiber so that one beam traverses the coil in a clockwise direction while the other beam propagates in the counterclockwise direction. Upon exiting the ends of the fiber coil, the beams are recombined in the beam splitter and form an interference pattern at the output of the gyroscope.

The reciprocal phase shift introduced into the counterpropagating beams by linear propagation will cancel at the output, but rotation of the coil will cause nonreciprocal phase shifts which add together and can thus be used to indicate the magnitude and direction of rotation. See, e.g., Yeh, Phase Conjugate Fiber Gyroscope, U.S. Pat. No. 4,681,446.

Although the problem of lockin is eliminated in the optical fiber design, other problems arise because this gyroscope will also detect any nonreciprocal effect which causes a phase shift, such as the Faraday effect, the nonlinear Kerr effect, or polarization mode coupling. Modal scrambling is a major source of noise and signal fading in fiber-optic gyroscopes. Consequently, the most sensitive fiber-optic gyroscopes use single-mode polarization-preserving fibers and couplers. Such a gyroscope is described, for example, in McMichael, et al., Self-Pumped Phase-Conjugate Fiber-Optic Gyro, Optics Letters, Volume 11, Pages 686–688 (October, 1986). Thus a need exists in the art of fiber-optic gyroscopes for a highly sensitive design which is not limited by the necessity to use a single-mode optical fiber.

SUMMARY OF THE INVENTION

An optical fiber rotation sensor includes a source of coherent light and a first polarizing beam splitter for transmitting a first component of the coherent light having a first polarization direction and reflecting a second component of the coherent light having a second polarization direction orthogonal to the first polarization direction. A coiled multimode optical fiber having first and second ends is coupled to the first beam splitter such that the first component is directed into the first end of the fiber and the second component is directed into the second end of the fiber, the first and second components thereby propagating in the fiber in opposite directions. A polarizer having a third polarization direction at 45° with respect to the first and second polarization directions receives the portion of the first component transmitted by the first beam splitter after propagating through the fiber and the portion of the second component reflected by the first beam splitter after propagating through the fiber. The polarizer transmits a linearly polarized third component containing equal contributions from the first and second components. A half-wave plate receives the third component from the polarizer and rotates the polarization of the third component by 45°.

A phase conjugating element is oriented to receive the polarization-rotated third component and reflect a phase-conjugated fourth component in a direction opposite to the third component by self-pumped phase conjugation, such that the fourth component retraverses the half-wave plate and the polarizer, then is divided by the first polarizing beam splitter into fifth and sixth components, the first beam splitter transmitting the fifth component with the first polarization direction and reflecting the sixth component with the second polarization direction. In this manner, the fifth component is directed into the second end of the fiber and the sixth component is directed into the first end of the fiber, the fifth and sixth components thereby propagating in the fiber in opposite directions.

A second polarizing beam splitter receives the portion of the fifth component reflected by the first beam splitter after propagating through the fiber and the portion of the sixth component transmitted by the first beam splitter after propagating through the fiber. The second beam splitter transmits a seventh component having the first polarization direction and reflects an eighth component having the second polarization direction. A first detector measures the power of the seventh component, while a second detector measures the power of the eighth component, the difference between the power of the seventh component and the power of the eighth component being related to the angular motion of the rotation sensor.

DESCRIPTION OF THE INVENTION

Figure 1:
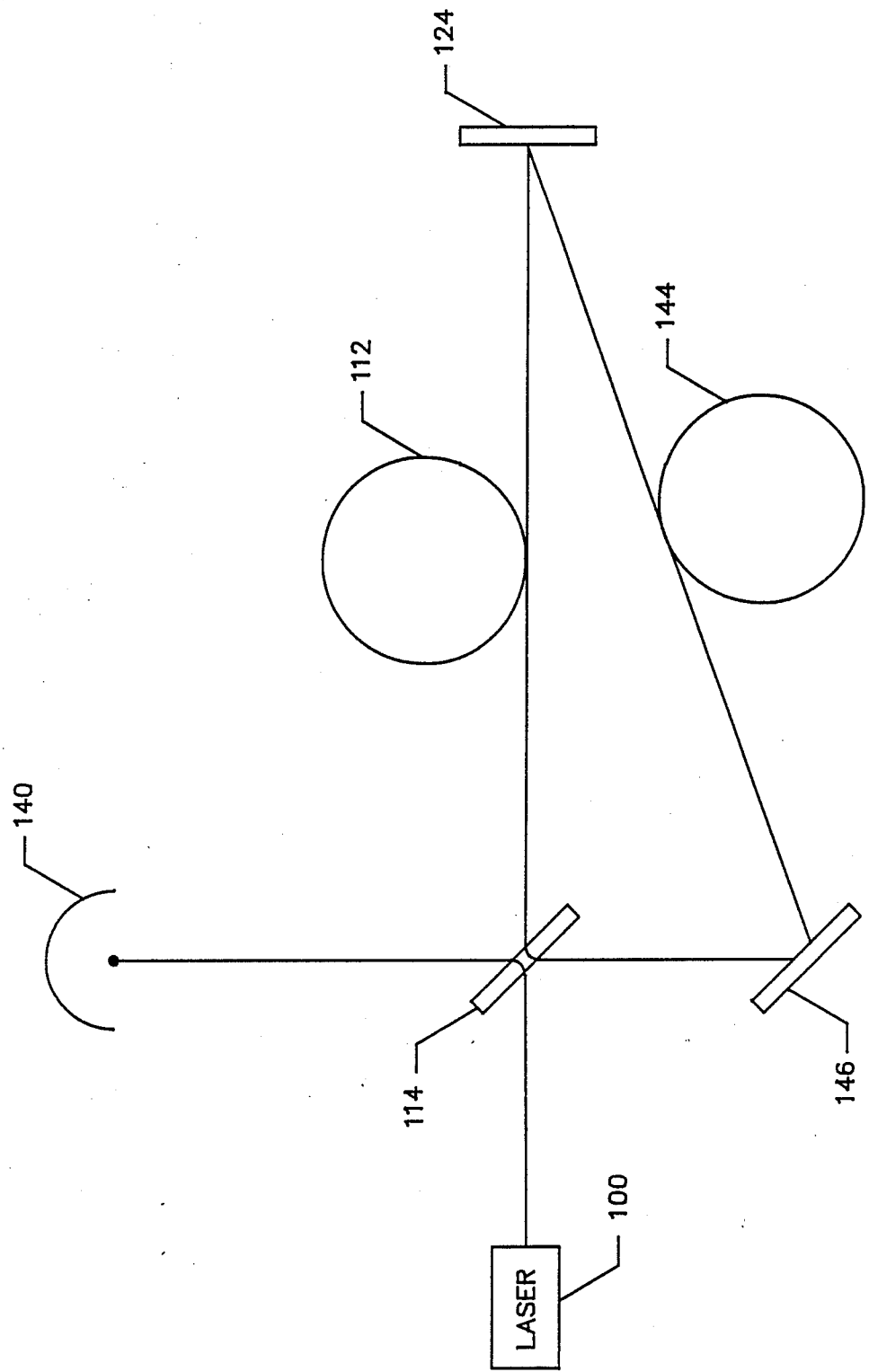
FIG. 1 is a simplified schematic diagram of a double phase-conjugate fiber-optic gyroscope.

FIG. 1 is a simplified schematic diagram of a double phase-conjugate fiber-optic gyroscope. Coherent light from a laser 100 is split by a beam splitter 114 and directed into a first fiber 112 and into a second fiber 144 by means of a mirror 146. The fibers are coiled in opposite directions, so that the incident light travels counterclockwise in the first fiber and clockwise in the second fiber. Light waves traversing the fibers experience reciprocal phase shifts due to propagation and environmental effects and nonreciprocal phase shifts due to the Sagnac effect. A self-pumped phase-conjugate mirror 124 produces time-reversed waves that correct the reciprocal phase shifts when they propagate back through the fibers, but the time-reversed waves do not correct for the nonreciprocal phase shifts. The phase difference between the recombining waves at a detector 140 is given by:

$$\phi = 4\pi(R_1 L_1 + R_2 L_2)\Omega/\lambda c \qquad (1)$$

where $R_1$, $R_2$ and $L_1$, $L_2$ are the radii and lengths, respectively, of the fiber coils 104 and 106, $\Omega$ is the rotation rate, $\lambda$ is the wavelength, and c is the speed of light. Since the phase difference $\phi$ is proportional to the rotation rate $\Omega$, the output of the detector 112 can be used to sense rotation.

Figure 2:
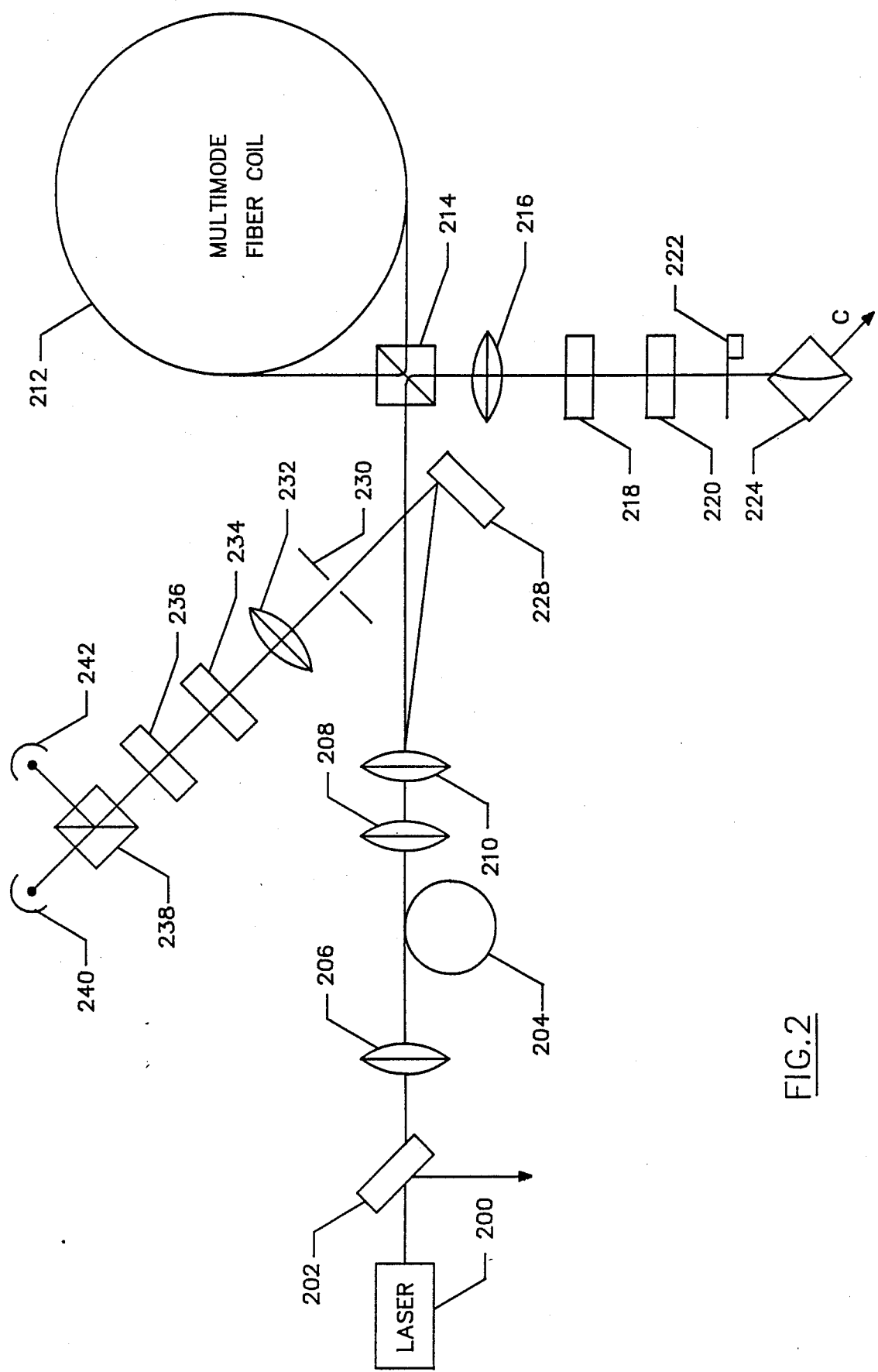
FIG. 2 is a schematic diagram illustrating one embodiment of a multimode fiber optic rotation sensor constructed according to the present invention.

FIG. 2 is a schematic diagram illustrating one embodiment of a multimode fiber optic rotation sensor constructed according to the present invention. Instead of using two separate fibers to carry clockwise and counterclockwise traveling waves, as in the device of FIG. 1, here polarization states are used to distinguish the clockwise and counterclockwise waves. In an experimental demonstration of this concept, the laser 200 was an argon-ion laser operating in the multilongitudinal mode at 515 nm. The highly reflective beamsplitter 202 isolated the laser from retroreflections. A single-mode polarization-preserving fiber 204 was used to couple light from the laser to the remainder of the apparatus, the latter being mounted on a rotating table. Lenses 206 and 208, which were 20X microscope objectives, focused light into the fiber 204 and collimated the output from the fiber, respectively. The output end of the fiber 204 was oriented such that the polarization of light emerging from the fiber was at an angle of 45° with respect to the plane of the drawing. The light emerging from the fiber 204, which had a power of approximately 10 mW, was then focused by a lens 210, with a focal length of 10 cm, into a multimode fiber coil 212. The component of this light which was polarized in the plane of the drawing was transmitted by a polarizing beam splitter 214 and traveled as a counterclockwise wave in the fiber coil, whereas the component polarized perpendicular to the plane of the drawing traveled as a clockwise wave. The fiber coil 212 consisted of approximately 20 m of graded-index multimode fiber (with a core diameter of 50 um, a numerical aperture of 0.2, and attenuation of 30 dB/km) coiled in a square having 0.57 m sides. Because of modal scrambling in the fiber, when the counterpropagating waves exited from the coil, their energy was randomly distributed among the spatial and polarization modes at the fiber output. Therefore one-half of the light from each wave exited the port of the beam splitter 214 which returned toward the laser 200. The other half of the light was collected by a lens 216, with a focal length of 10 cm, and one-half of that passed through a polarizer 218, which was oriented with its polarization direction at 45° with respect to the plane of the drawing, in order to produce linearly polarized light with equal contributions from the clockwise and counterclockwise waves. The polarization of the light exiting from the polarizer was rotated back into the plane of the drawing by a half-wave retarder 220. The light was then chopped at 200 Hz by a chopper 222 and then entered a barium titanate (BaTiO$_3$)crystal 224 with its extraordinary polarization arranged so that efficient self-pumped phase conjugation could occur. The power incident on the crystal was approximately 1 mW, while the phase-conjugate reflectivity was approximately 20%.

The phase-conjugated light from the crystal 224 then retraversed the fiber 212 in both directions, recombined at the beam splitter 214, and traveled back toward the laser 200. This light was sampled by the reflection from an uncoated plano surface of the lens 210 and from a mirror 228, then was focused by the lens 210 through a pinhole 230, which had a diameter of 150 $\mu$m. The pinhole acted as a spatial filter to pass the phase-conjugated light and to block returning light that was not phase-conjugated. Although this filter is not believed to be essential to measure the rotation signal, it serves to enhance the signal-to-background-noise ratio. A lens 232 collimated the light passing through the pinhole. A quarter-wave retarder 234 produced a 90° phase shift between the clockwise and counterclockwise waves and biased the gyro at the point of maximum sensitivity. A half-wave retarder 236 was oriented such that the interferences of the light passing through a second polarizing beam splitter 238 and measured by detectors 240 and 242 contained equal components from the original clockwise and counterclockwise waves. The power incident upon each detector was approximately 1 uW. The signals from these detectors were directed to a differential amplifier, a lock-in amplifier referenced to the chopper frequency, and a digital oscilloscope, which provided an indication of the rotation of the apparatus. The time required for the gyroscope rotation signal to reach a steady state after each rotational acceleration ended was a result of the response time of the BaTiO$_3$ crystal 224 (a matter of seconds at milliwatt power levels) and the time constant set on the lock-in amplifier (1 sec). The experimentally measured phase shift was in good agreement with the predicted phase shift of 0.09 rad. Various rotational amplitudes and periods were examined. In all cases, the signal decayed only after the rotation had stopped. Short-term background noise corresponded to a sensitivity that was an order of magnitude larger than that required to measure the rotation rate of the earth. Drift on a longer time scale was also observed, and may be due to changes in the phase-conjugate reflectivity of the self-pumped conjugator 224.

The preferred embodiments of this invention have been illustrated and described above. Modifications and additional embodiments, however, will undoubtedly be apparent to those skilled in the art. In the configuration of FIG. 2, for example, most of the original optical energy entering the fiber coil does not reach the detectors. These losses arise from two sources. First, the configuration required to used a single multimode fiber coil involves light consisting of many modes having random polarization passing through the polarizing beam splitter twice. This loss can be avoided by using a configuration having two fibers, such as that illustrated in FIG. 1. The second source of loss is the non-polarization-preserving phase conjugator formed by the nolarizer 218, the half wave plate 220, and the crystal 224. This loss can be avoided by using a polarization-preserving phase conjugator. Furthermore, equivalent elements may be substituted for those illustrated and described herein, parts or connections might be reversed or otherwise interchanged, and certain features of the invention may be utilized independent of other features. Although, for example, a BaTiO$_3$ crystal was used in the exemplary embodiment discussed above, other phase conjugating materials, such as Ba$_{2-x}$Sr$_x$K$_{1-y}$Na$_y$Nb$_5$O$_{15}$, KNbO$_3$, and Sr$_{1-x}$Ba$_x$Nb$_2$O$_6$, could be used as well. Consequently, the exemplary embodiments should be considered illustrative, rather than inclusive, while the appended claims are more indicative of the full scope of the invention.

The teaching of the following documents, which are referred to herein, is incorporated by reference:

McMichael, et al., Self-Pumped Phase-Conjugate Fiber-Optic Gyro, Optics Letters, Volume 11, Pages 686–688 (October, 1986);

Yeh, Phase Conjugate Fiber Gyroscope, U.S. Pat. No. 4,681,446.

I claim:

1. An optical fiber rotation sensor, comprising:
    a source of coherent light;
    a first polarizing beam splitter for transmitting a first component of the coherent light having a first polarization direction and reflecting a second component of the coherent light having a second polarization direction orthogonal to the first polarization direction;
    a coiled multimode optical fiber having first and second ends coupled to the first beam splitter such that the first component is directed into the first end of the fiber and the second component is directed into the second end of the fiber, the first and second components thereby propagating in the fiber in opposite directions;
    a polarizer having a third polarization direction at 45° with respect to the first and second polarization directions for receiving the portion of the first component transmitted by the first beam splitter after propagating through the fiber and for receiving the portion of the second component reflected by the first beam splitter after propagating through the fiber, the polarizer thereby transmitting a linearly polarized third component containing equal contributions from the first and second components;
    a half-wave plate for receiving the third component from the polarizer and rotating the polarization of the third component by 45°;
    a phase conjugating element oriented to receive the polarization-rotated third component and reflect a phase-conjugated fourth component in a direction opposite to the third component by self-pumped phase conjugation,
    such that the fourth component retraverses the half-wave plate and the polarizer, then is divided by the first polarizing beam splitter into fifth and sixth components, the first beam splitter transmitting the fifth component with the first polarization direction and reflecting the sixth component with the second polarization direction;
    such that the fifth component is directed into the second end of the fiber and the sixth component is directed into the first end of the fiber, the fifth and sixth components thereby propagating in the fiber in opposite directions;
    a second polarizing beam splitter for receiving the portion of the fifth component reflected by the first beam splitter after propagating through the fiber and for receiving the portion of the sixth component transmitted by the first beam splitter after propagating through the fiber, the second beam splitter transmitting a seventh component having the first polarization direction and reflecting an eighth component having the second polarization direction;
    a first detector for measuring the power of the seventh component; and
    a second detector for measuring the power of the eighth component, the difference between the power of the seventh component and the power of the eighth component being related to the angular motion of the rotation sensor.

2. The rotation sensor of claim 1, wherein the source of coherent light further comprises a laser.

3. The rotation sensor of claim 1, wherein the phase conjugating element further comprises a phase conjugating crystal selected from the group consisting of Ba$_{2-x}$Sr$_x$K$_{1-y}$Na$_y$Nb$_5$O$_{15}$, BaTiO$_3$, KNbO$_3$, and Sr$_{1-x}$Ba$_x$Nb$_2$O$_6$.

4. A method of sensing rotation, comprising the steps of:
    providing a source of coherent light;
    placing a first polarizing beam splitter in the path of the coherent light to transmit a first component of the coherent light having a first polarization direction and reflect a second component of the coherent light having a second polarization direction orthogonal to the first polarization direction;
    coupling first and second ends of a coiled multimode optical fiber to the first beam splitter such that the first component is directed into the first end of the fiber and the second component is directed into the second end of the fiber, the first and second components thereby propagating in the fiber in opposite directions;
    providing a polarizer having a third polarization direction at 45° with respect to the first and second polarization directions;
    directing the portion of the first component transmitted by the first beam splitter after propagating through the fiber at the polarizer;
    directing the portion of the second component reflected by the first beam splitter after propagating through the fiber at the polarizer, the polarizer thereby transmitting a linearly polarized third component containing equal contributions from the first and second components;

rotating the polarization of the third component by 45° with a half-wave plate;

phase-conjugating the polarization-rotated third component as a fourth component;

reflecting the phase-conjugated fourth component in a direction opposite to the third component, such that the fourth component retraverses the half-wave plate and the polarizer, then is divided by the first polarizing beam splitter into fifth and sixth components, the first beam splitter transmitting the fifth component with the first polarization direction and reflecting the sixth component with the second polarization direction;

such that the fifth component is directed into the second end of the fiber and the sixth component is directed into the first end of the fiber, the fifth and sixth components thereby propagating in the fiber in opposite directions, providing a second polarizing beam splitter for receiving the portion of the fifth component reflected by the first beam splitter after propagating through the fiber and for receiving the portion of the sixth component transmitted by the first beam splitter after propagating through the fiber;

using the second beam splitter to transmit a seventh component having the first polarization direction;

using the second beam splitter to reflect an eighth component having the second polarization direction;

measuring the power of the seventh component;

measuring the power of the eighth component; and relating the difference between the power of the seventh component and the power of the eighth component to the angular motion of the rotation sensor.

* * * * *